US012211437B2

(12) United States Patent
Zhang et al.

(10) Patent No.: US 12,211,437 B2
(45) Date of Patent: Jan. 28, 2025

(54) DISPLAY PANEL, PIXEL CIRCUIT, AND METHOD FOR DRIVING A PIXEL CIRCUIT HAVING A POTENTIAL DIFFERENCE SMALLER THAN A TURN-ON VOLTAGE OF A LIGHT-EMITTING ELEMENT

(71) Applicants: Chengdu BOE Optoelectronics Technology Co., Ltd., Sichuan (CN); BOE Technology Group Co., Ltd., Beijing (CN)

(72) Inventors: Jingwen Zhang, Beijing (CN); Yunsheng Xiao, Beijing (CN); Miao Wang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/766,279

(22) PCT Filed: May 21, 2021

(86) PCT No.: PCT/CN2021/095346
§ 371 (c)(1),
(2) Date: Apr. 4, 2022

(87) PCT Pub. No.: WO2022/241798
PCT Pub. Date: Nov. 24, 2022

(65) Prior Publication Data

US 2024/0071301 A1 Feb. 29, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2310/08; G09G 2320/0238; G09G 2320/0247; G09G 3/32
See application file for complete search history.

(56) References Cited

U.S. PATENT DOCUMENTS

2018/0190194 A1 7/2018 Zhu et al.
2018/0226025 A1 8/2018 Wu et al.
(Continued)

FOREIGN PATENT DOCUMENTS

CN 104575367 A 4/2015
CN 107342049 A 11/2017
(Continued)

*Primary Examiner* — Benjamin C Lee
*Assistant Examiner* — Nathan P Brittingham
(74) *Attorney, Agent, or Firm* — Lippes Mathias LLP

(57) ABSTRACT

Provided is a pixel circuit. In the pixel circuit, a data write circuit may transmit a data signal to a first node; a compensation circuit may adjust a potential of a second node and a potential of a third node based on a gate drive signal; a first reset circuit may transmit a first initial power supply signal to the third node; a drive circuit may transmit a drive signal to the second node based on the potential of the third node and a potential of the first node; and a second reset circuit may transmit a second initial power supply signal to a first electrode of a light-emitting element.

19 Claims, 10 Drawing Sheets

(52) U.S. Cl.
CPC . *G09G 2310/08* (2013.01); *G09G 2320/0238* (2013.01); *G09G 2320/0247* (2013.01)

(56) References Cited

U.S. PATENT DOCUMENTS

| | | | | |
|---|---|---|---|---|
| 2019/0096327 | A1 | 3/2019 | Peng et al. | |
| 2020/0411611 | A1 | 12/2020 | Liu et al. | |
| 2022/0230592 | A1* | 7/2022 | Zhao | G09G 3/3258 |
| 2022/0310016 | A1* | 9/2022 | Yang | G09G 3/3266 |

FOREIGN PATENT DOCUMENTS

| | | | |
|---|---|---|---|
| CN | 107358915 | A | 11/2017 |
| CN | 107610652 | A | 1/2018 |
| CN | 108492782 | A | 9/2018 |
| CN | 110265458 | A | 9/2019 |
| CN | 111508422 | A | 8/2020 |
| CN | 111613180 | A | 9/2020 |
| CN | 111724744 | A | 9/2020 |
| CN | 111816119 | A | 10/2020 |
| CN | 111833812 | A | 10/2020 |
| CN | 112133253 | A | 12/2020 |

* cited by examiner

DISPLAY PANEL, PIXEL CIRCUIT, AND METHOD FOR DRIVING A PIXEL CIRCUIT HAVING A POTENTIAL DIFFERENCE SMALLER THAN A TURN-ON VOLTAGE OF A LIGHT-EMITTING ELEMENT

CROSS-REFERENCE TO RELATED APPLICATION

This application is a 371 of PCT application No. PCT/CN2021/095346, filed on May 21, 2021, the disclosure of which is herein incorporated by reference in its entirety.

TECHNICAL FIELD

The present disclosure relates to the field of display technologies, and in particular relates to a pixel circuit, a method for driving the same, and a display panel.

BACKGROUND

An active matrix organic light emitting diode (AMOLED) display panel generally includes a plurality of pixels, each pixel includes a pixel circuit and a light-emitting element coupled to each other, and the pixel circuit is configured to drive the light-emitting element to emit light.

In the related art, each pixel circuit includes a data write circuit, a reset circuit and a drive circuit. Both of the reset circuit and the drive circuit are coupled to the light-emitting element, and both of the drive circuit and the data write circuit are coupled at a target node. The reset circuit is configured to transmit a reset signal to the light-emitting element, the data write circuit is configured to transmit a data signal to the target node, and the drive circuit is configured to drive the light-emitting element to emit light based on the potential of the target node.

SUMMARY

Embodiments of the present disclosure provide a pixel circuit, a method for driving the same, and a display panel. The technical solutions are as follow.

In an aspect, a pixel circuit is provided. The pixel circuit includes:

a data write circuit, coupled to a gate drive terminal, a data signal terminal and a first node and configured to transmit a data signal provided by the data signal terminal to the first node in response to a gate drive signal provided by the gate drive terminal;

a compensation circuit, coupled to the gate drive terminal, a second node and a third node and configured to adjust a potential of the second node and a potential of the third node in response to the gate drive signal;

a first reset circuit, coupled to a first reset signal terminal, a first initial power supply terminal and the third node and configured to transmit a first initial power supply signal provided by the first initial power supply terminal to the third node in response to a first reset signal provided by the first reset signal terminal;

a drive circuit, coupled to the first node, the second node and the third node and configured to transmit a drive signal to the second node in response to the potential of the third node and a potential of the first node; and a second reset circuit, coupled to a second reset signal terminal, a second initial power supply terminal and a first electrode of a light-emitting element, a second electrode of the light-emitting element being coupled to a pull-down power supply terminal, wherein the second reset circuit is configured to transmit a second initial power supply signal provided by the second initial power supply terminal to the first electrode of the light-emitting element in response to a second reset signal provided by the second reset signal terminal;

wherein a difference between a potential of the second initial power supply signal and a potential of a pull-down power supply signal provided by the pull-down power supply terminal is smaller than a turn-on voltage of the light-emitting element, and the potential of the second initial power supply signal is greater than the potential of the pull-down power supply signal.

Optionally, a difference between a first potential difference and a second potential difference of the pixel circuit in a light-emitting stage is smaller than or equal to a difference threshold;

wherein the first potential difference is a potential difference between the third node and a first reference node, the second potential difference is a potential difference between the third node and a second reference node, the first reference node being a series node between two transistors in a double-gate transistor in the compensation circuit, and the second reference node being one of a series node between two transistors in a double-gate transistor in the first reset circuit and a coupling node between a single-gate transistor in the first reset circuit and the first initial power supply terminal.

Optionally, the first reset circuit includes a first reset transistor; wherein a gate of the first reset transistor is coupled to the first reset signal terminal, a first electrode of the first reset transistor is coupled to the first initial power supply terminal, and a second electrode of the first reset transistor is coupled to the third node;

the first reset transistor is a double-gate transistor, and the second reference node is a series node between two transistors in the first reset transistor; or the first reset transistor is a single-gate transistor, and the second reference node is a coupling node between the first electrode of the first reset transistor and the first initial power supply terminal.

Optionally, the difference threshold is greater than or equal to 0 V and smaller than or equal to 0.5 V.

Optionally, a potential of the first initial power supply signal is greater than a minimum potential of the data signal and smaller than a turn-on potential of a transistor in the drive circuit.

Optionally, a potential of the first initial power supply signal is smaller than a minimum potential of the data signal.

Optionally, the second reference node is a series node of a double-gate transistor in the first reset circuit; and the potential of the first initial power supply signal is greater than a sum of the minimum potential of the data signal and a threshold voltage of any transistor in the double-gate transistor in the first reset circuit.

Optionally, a potential of the first initial power supply signal is smaller than or equal to a difference between a minimum potential of the data signal and a first reference potential;

wherein the first reference potential is 2 V.

Optionally, the potential of the second initial power supply signal is smaller than or equal to a sum of the potential of the pull-down power supply signal and a second reference potential;

wherein the second reference potential is 0.5 V.

Optionally, a minimum potential of the data signal is the same as the potential of the pull-down power supply signal.

Optionally, a potential of the first initial power supply signal is smaller than the minimum potential of the data signal, and the potential of the second initial power supply signal is greater than the minimum potential of the data signal.

Optionally, the second reset circuit includes a second reset transistor; wherein a gate of the second reset transistor is coupled to the second reset signal terminal, a first electrode of the second reset transistor is coupled to the second initial power supply terminal, and a second electrode of the second reset transistor is coupled to the first electrode of the light-emitting element.

Optionally, the first reset signal terminal and the second reset signal terminal are the same reset signal terminal.

Optionally, the compensation circuit includes a compensation transistor, and the compensation transistor is a double-gate transistor; wherein a gate of the compensation transistor is coupled to the gate drive terminal, a first electrode of the compensation transistor is coupled to the second node, and a second electrode of the compensation transistor is coupled to the third node.

Optionally, the data write circuit includes a data write transistor; and the drive circuit includes a drive transistor; wherein a gate of the data write transistor is coupled to the gate drive terminal, a first electrode of the data write transistor is coupled to the data signal terminal, and a second electrode of the data write transistor is coupled to the first node; and a gate of the drive transistor is coupled to the third node, a first electrode of the drive transistor is coupled to the first node, and a second electrode of the drive transistor is coupled to the second node.

Optionally, the pixel circuit further includes a first light-emitting control circuit, a second light-emitting control circuit and a storage circuit; wherein the first light-emitting control circuit is coupled to a light-emitting control terminal, a drive power supply terminal and the first node, and configured to transmit a drive power supply signal provided by the drive power supply terminal to the first node in response to a light-emitting control signal provided by the light-emitting control terminal;

the second light-emitting control circuit is coupled to the light-emitting control terminal, the second node and the first electrode of the light-emitting element, and configured to control conduction/non-conduction between the second node and the first electrode of the light-emitting element in response to the light-emitting control signal; and the storage circuit is coupled to the drive power supply terminal and the third node, and configured to adjust the potential of the third node based on the drive power supply signal.

Optionally, the first light-emitting control circuit includes a first light-emitting control transistor; the second light-emitting control circuit includes a second light-emitting control transistor; and the storage circuit includes a storage capacitor; wherein a gate of the first light-emitting control transistor is coupled to the light-emitting control terminal, a first electrode of the first light-emitting control transistor is coupled to the drive power supply terminal, and a second electrode of the first light-emitting control transistor is coupled to the first node;

a gate of the second light-emitting control transistor is coupled to the light-emitting control terminal, a first electrode of the second light-emitting control transistor is coupled to the second node, and a second electrode of the second light-emitting control transistor is coupled to the first electrode of the light-emitting element; and one end of the storage capacitor is coupled to the third node, and the other end of the storage capacitor is coupled to the drive power supply terminal.

In another aspect, a method for driving a pixel circuit is provided. The method includes:

in a resetting stage, transmitting, by a first reset circuit, a first initial power supply signal provided by a first initial power supply terminal to a third node in response to a first reset signal provided by a first reset signal terminal, and transmitting, by a second reset circuit, a second initial power supply signal provided by a second initial power supply terminal to a first electrode of a light-emitting element in response to a second reset signal provided by a second reset signal terminal, wherein a potential of the first reset signal and a potential of the second reset signal are both a first potential;

in a data writing stage, transmitting, by a data write circuit, a data signal provided by a data signal terminal to a first node in response to a gate drive signal provided by a gate drive terminal, and adjusting, by a compensation circuit, a potential of a second node and a potential of the third node in response to the gate drive signal, wherein a potential of the gate drive signal is the first potential; and in a light-emitting stage, transmitting, by a drive circuit, a drive signal to the second node in response to the potential of the third node and a potential of the first node;

wherein a difference between a potential of the second initial power supply signal and a potential of a pull-down power supply signal provided by a pull-down power supply terminal coupled to a second electrode of the light-emitting element is smaller than a turn-on voltage of the light-emitting element, and the potential of the second initial power supply signal is greater than the potential of the pull-down power supply signal.

In still another aspect, a display panel is provided. The display panel includes a plurality of pixels, wherein at least one of the pixels includes a light-emitting element and the pixel circuit described in the above aspect. The pixel circuit is coupled to the light-emitting element and configured to drive the light-emitting element to emit light.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following descriptions show merely some embodiments of the present disclosure, and a person of ordinary skill in the art may still derive other drawings from these accompanying drawings without creative efforts.

DETAILED DESCRIPTION

Figure 1:
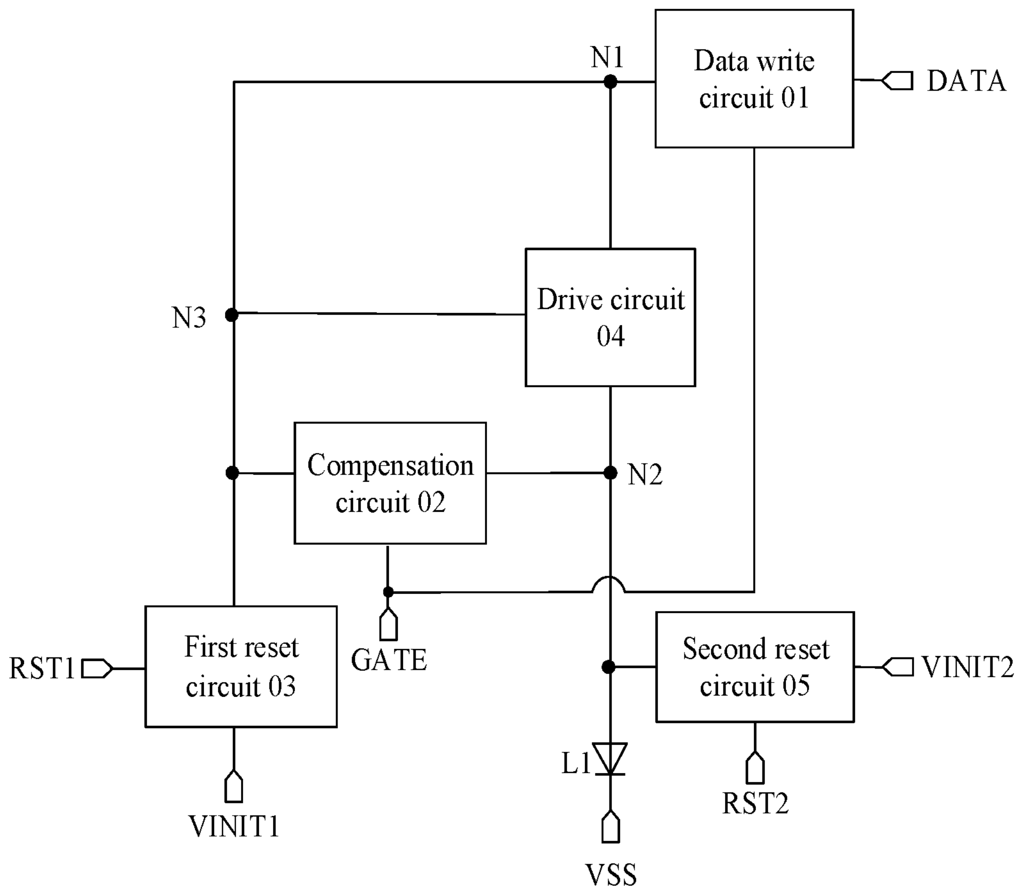
FIG. 1 is a schematic structural diagram of a pixel circuit according to an embodiment of the present disclosure.

The present disclosure will be described in further detail below with reference to the accompanying drawings, to present the objectives, technical solutions, and advantages of the present disclosure more clearly.

Transistors adopted in all the embodiments of the present disclosure may be thin film transistors (TFTs), field effect transistors (FETs) or other devices having the same properties. Based on their functions in the circuit, the transistors adopted in the embodiments of the present disclosure are generally switching transistors. Since a source and a drain of the switching transistor adopted herein are symmetrical, the source and drain are interchangeable. In the embodiments of the present disclosure, the source is referred to as a first electrode and the drain is referred to as a second electrode; or, the drain may be referred to as a first electrode and the source may be referred to as a second electrode. Based on the formation in the drawings, an intermediate end of the transistor is the gate, a signal input end of the transistor is the source and a signal output end of the transistor is the drain. In addition, the switching transistor adopted in the embodiments of the present disclosure may include any one of a P-type switching transistor and an N-type switching transistor. The P-type switching transistor is turned on when the gate is at a low level and turned off when the gate is at a high level, and the N-type switching transistor is turned on when the gate is at a high level and turned off when the gate is at a low level. Moreover, a plurality of signals in the embodiments of the present disclosure each have a first potential and a second potential. The first potential and the second potential merely indicate that the potential of the signal has two quantities of state, rather than indicating that the first potential or the second potential has a specific value in the whole text.

Flicker of a display panel refers to the phenomenon that the screen flickers continuously when the display panel displays a picture. Flicker is an unfavorable state of the display panel, and usually occurs in low-frequency driving circumstances. Severe flicker may cause poor quality of the picture displayed on the display panel, and may result in fatigue of human eyes during watching, thereby affecting the user experience. An embodiment of the present disclosure provides a pixel circuit, and a display panel including the pixel circuit is not prone to flicker and thus has a better display effect.

FIG. 1 is a schematic structural diagram of a pixel circuit according to an embodiment of the present disclosure. As shown in FIG. 1, the pixel circuit may include a data write circuit 01, a compensation circuit 02, a first reset circuit 03, a drive circuit 04 and a second reset circuit 05.

The data write circuit 01 may be coupled to a gate drive terminal GATE, a data signal terminal DATA and a first node N1. Coupling may refer to an electrical connection. The data write circuit 01 may be configured to transmit a data signal provided by the data signal terminal DATA to the first node N1 in response to a gate drive signal provided by the gate drive terminal GATE.

For example, the data write circuit 01 may transmit the data signal provided by the data signal terminal DATA to the first node N1 in response to a potential of the gate drive signal provided by the gate drive terminal GATE being a first potential. Optionally, the first potential may be an effective potential.

The compensation circuit 02 may be coupled to the gate drive terminal GATE, a second node N2 and a third node N3, and configured to adjust a potential of the second node N2 and a potential of the third node N3 in response to the gate drive signal. In the embodiment of the present disclosure, the compensation circuit 02 may include a double-gate transistor, and the double-gate transistor refers to a transistor including two switching tubes connected in series.

For example, the compensation circuit 02 may adjust the potential of the third node N3 based on the potential of the second node N2 in response to the potential of the gate drive signal being the first potential.

The first reset circuit 03 may be coupled to a first reset signal terminal RST1, a first initial power supply terminal VINIT1 and the third node N3, and configured to transmit a first initial power supply signal provided by the first initial power supply terminal VINIT1 to the third node N3 in response to a first reset signal provided by the first reset signal terminal RST1. In the embodiment of the present disclosure, the first reset circuit 03 may include a double-gate transistor or a single-gate transistor, and the single-gate transistor refers to a transistor including only one switching tube.

For example, the first reset circuit 03 may transmit the first initial power supply signal provided by the first initial power supply terminal VINIT1 to the third node N3 in response to a potential of the first reset signal provided by the first reset signal terminal RST1 being the first potential. The potential of the first initial power supply signal may be a second potential. Optionally, the second potential may be an ineffective potential, and the first potential may be a low potential relative to the second potential.

The drive circuit 04 may be coupled to the first node N1, the second node N2 and the third node N3, and configured to transmit a drive signal to the second node N2 in response to the potential of the third node N3 and the potential of the first node N1.

For example, the drive circuit 04 may transmit the drive signal (e.g., drive current) to the second node N2 based on the potential of the third node N3 and the potential of the first node N1 in a light-emitting stage. A light-emitting element may be coupled to the second node N2 and may be driven by the drive signal to emit light.

The second reset circuit 05 may be coupled to a second reset signal terminal RST2, a second initial power supply terminal VINIT2 and a first electrode of the light-emitting element L, and a second electrode of the light-emitting element L1 may be coupled to a pull-down power supply terminal VSS. The second reset circuit 05 may be configured to transmit a second initial power supply signal provided by the second initial power supply terminal VINIT2 to the first electrode of the light-emitting element L1 in response to a second reset signal provided by the second reset signal terminal RST2. The first electrode of the light-emitting element L1 may be an anode shown in FIG. 1, and correspondingly, the second electrode of the light-emitting element L1 may be a cathode shown in FIG. 1. Certainly, in some embodiments, the first electrode of the light-emitting element L1 may also be the cathode, and correspondingly, the second electrode of the light-emitting element L1 may also be the anode.

For example, the second reset circuit 05 may transmit the second initial power supply signal provided by the second initial power supply terminal VINIT2 to the first electrode of the light-emitting element L1 in response to the potential of the second reset signal provided by the second reset signal terminal RST2 being the first potential. Optionally, the potential of the second initial power supply signal may be the second potential, and may be different from the potential of the first initial power supply signal, that is, the second initial power supply terminal VINIT2 and the first initial power supply terminal VINIT1 are two independent initial power supply terminals.

Optionally, in the embodiment of the present disclosure, the potential of the second initial power supply signal may be smaller than 0. The difference between the potential of the second initial power supply signal and a potential of a pull-down power supply signal provided by the pull-down power supply terminal VSS may be smaller than a turn-on voltage of the light-emitting element L1, and the potential of the second initial power supply signal may be greater than the potential of the pull-down power supply signal. It should be noted that the potential of the second initial power supply signal may be flexibly set based on the luminance of the display panel when displaying a black-state picture, to ensure a better display effect of the black-state picture.

The turn-on voltage of the light-emitting element L1 refers to a minimum voltage required for turning on the light-emitting element L1. The light-emitting element L1 generally may not be turned on until the voltage difference between the first electrode of the light-emitting element L1 and the second electrode of the light-emitting element L1 reaches the turn-on voltage. In this way, by setting the difference between the potential of the second initial power supply signal written into the first electrode of the light-emitting element L1 and the potential of the pull-down power supply signal written into the second electrode of the light-emitting element L1 to be smaller than the turn-on voltage of the light-emitting element L1, the problem that the light-emitting element L1 is mistakenly turned on prior to the light-emitting stage can be effectively prevented, and normal display of the display panel can be ensured.

In addition, the drive signal transmitted by the drive circuit 04 to the second node N2 is at a low potential when the display panel displays a low-grayscale picture. In the case that the second initial power supply signal written into the first electrode of the light-emitting element L is also at a low potential, it takes a longer time to reach the turn-on voltage of the light-emitting element L1 in the light-emitting stage. In other words, it takes a longer time for the light-emitting element L1 to be turned on in the light-emitting stage. In this way, the display panel may be in low luminance for a longer time when displaying one frame of picture. When human eyes catch the luminance difference of the display panel, visual flicker may occur, which affects the user's viewing experience. The flicker may also be referred to as a low-grayscale flicker.

However, in the embodiment of the present disclosure, since the potential of the second initial power supply signal is set to be greater than the potential of the pull-down power supply signal, when the display panel displays the low-grayscale picture, the voltage difference between the first electrode of the light-emitting element L1 and the second electrode of the light-emitting element L1 may rapidly increase to the voltage required for turning on the light-emitting element L1 in the light-emitting stage, that is, the turn-on voltage of the light-emitting element L1. In other words, the light-emitting element L1 may be turned on in a short period of time, that is, it is easier to turn on the light-emitting element L1. In this way, the display panel can be effectively prevented from the low-grayscale flicker.

In summary, the embodiment of the present disclosure provides the pixel circuit. In the pixel circuit, the data write circuit may transmit the data signal to the first node; the compensation circuit may adjust the potential of the second node and the potential of the third node based on the gate drive signal; the first reset circuit may transmit the first initial power supply signal to the third node; the drive circuit may transmit the drive signal to the second node based on the potential of the third node and the potential of the first node; and the second reset circuit may transmit the second initial power supply signal to the light-emitting element. In addition, the compensation circuit includes the double-gate transistor. Since the difference between the potential of the second initial power supply signal and the potential of the pull-down power supply signal is smaller than the turn-on voltage of the light-emitting element, and the potential of the second initial power supply signal is greater than the potential of the pull-down power supply signal, not only the light-emitting element can be effectively prevented from being turned on mistakenly prior to the light-emitting stage, but also it is easier to turn on the light-emitting element in the light-emitting stage, which effectively prevents the display panel from flicker.

Optionally, the potential of the second initial power supply signal may be smaller than or equal to the sum of the potential Vss of the pull-down power supply signal and a second reference potential. The second reference potential may be 0.5 V. Therefore, the potential Vinit2 of the second initial power supply signal may be smaller than or equal to Vss+0.5 V.

Figure 2:
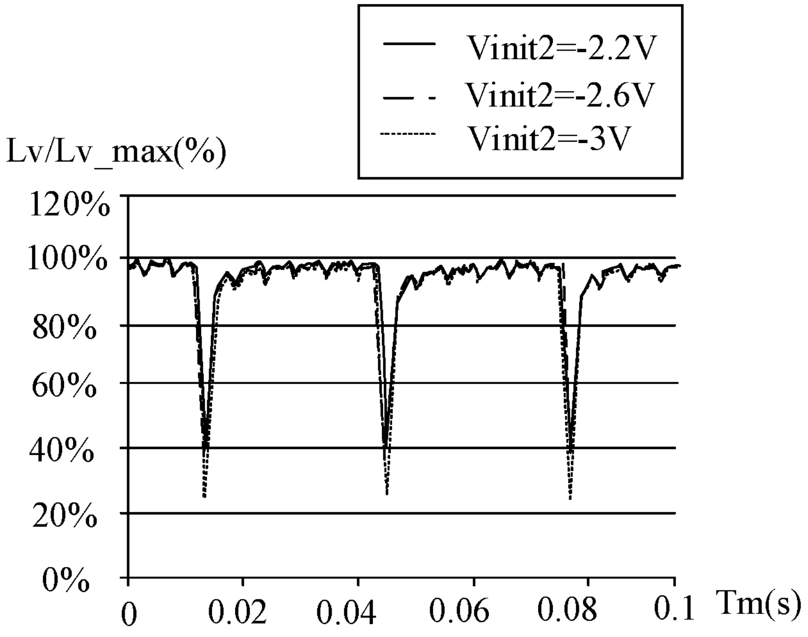
FIG. 2 is a schematic diagram showing a change of a luminance retention rate of a display panel with time under different potentials of a second initial power supply signal according to an embodiment of the present disclosure.
Figure 3:
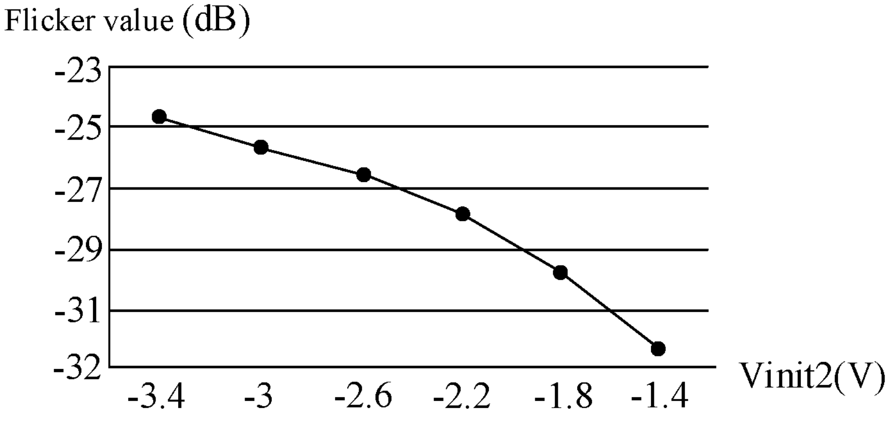
FIG. 3 is a schematic diagram showing a change of a flicker value of a display panel with a potential of a second initial power supply signal according to an embodiment of the present disclosure.

By taking the luminous intensity per unit area of the display panel is 450 nit, and the display panel displays a 32 grayscale picture as a test condition, FIG. 2 shows a schematic diagram showing the change of a luminance retention rate of a display panel with time when the potential Vinit2 of the second initial power supply signal is −2.2 V, −2.6 V and −3 V respectively under this test condition, and FIG. 3 shows a schematic diagram showing the change of a flicker value of a display panel with the potential Vinit2 of the second initial power supply signal under this test condition.

In FIG. 2, the horizontal axis represents time Tm, in units of second (s), and the vertical axis represents the luminance retention rate of the display panel. It can be seen from FIG. 2 that the greater the potential Vinit2 of the second initial power supply signal is, the higher the luminance retention rate is when the display panel displays one frame of picture.

In FIG. 3, the horizontal axis represents the potential Vinit2 of the second initial power supply signal in units of volt (V), and the vertical axis represents the flicker value of the display panel in units of decibel (dB). It can be seen from FIG. 3 that the greater the potential Vinit2 of the second initial power supply signal is, the less likely the display panel is to flicker.

In the embodiment of the present disclosure, a series node between two transistors in the double-gate transistor included in the compensation circuit 02 may be defined as a first reference node, and one of a series node between two transistors in the double-gate transistor included in the first reset circuit 03 and a coupling node between the single-gate transistor included in the first reset circuit 03 and the first initial power supply terminal VINIT1 may be defined as a second reference node. On this basis, a potential difference between the third node N3 and the first reference node may be defined as a first potential difference, and a potential difference between the third node N3 and the second reference node may be defined as a second potential difference.

It should be noted that in the light-emitting stage, both of the potential of the first reference node and the potential of the second reference node may influence the potential of the third node N3 due to the electric leakage of the transistor included in the compensation circuit 02 and/or electric leakage of the transistor included in the first reset circuit 03, and the influences are generally opposite. On this basis, if the degree of influence of the potential of the first reference node on the potential of the third node N3 differs greatly from the degree of influence of the potential of the second reference node on the potential of the third node N3, that is, if the first potential difference and the second potential difference defined above differ greatly, the potential of the third node N3 may be poor in stability. Thus, when the display panel displays one frame of picture, the luminance changes greatly, that is, the luminance retention rate is low. If the luminance changes greatly, it may be observed by human eyes, and the display panel may flicker.

However, in the embodiment of the present disclosure, in the light-emitting stage, the difference between the first potential difference and the second potential difference is smaller than or equal to a difference threshold, that is, there is a small difference between the first potential difference and the second potential difference. In this way, the degree of influence of the potential of the first reference node on the potential of the third node N3 may differ slightly from the degree of influence of the potential of the second reference node on the potential of the third node N3. Thus, good stability of the potential of the third node N3 can be effectively ensured, and flicker of the display panel can be reduced.

For example, in the case that the difference between the first potential difference and the second potential difference is set to equal the difference threshold and the difference threshold is set to be 0, the first potential difference and the second potential difference may be equal. In other words, the degree of influence of the potential of the first reference node on the potential of the third node N3 may be the same as the degree of influence of the potential of the second reference node on the potential of the third node N3, which effectively reduces flicker of the display panel.

Optionally, in the embodiment of the present disclosure, the difference between the first potential difference and the second potential difference may be made smaller than or equal to the difference threshold by adjusting the potential of the first initial power supply signal.

By testing, the potential of the third node N3 is generally low when the display panel displays a high-grayscale picture. Correspondingly, the first potential difference may differ greatly from the second potential difference in this case. Therefore, the above-mentioned flicker may also be referred to as a high-grayscale flicker. In other words, the high-grayscale flicker of the display panel can be effectively reduced by setting the difference between the first potential difference and the second potential difference to be less than or equal to the difference threshold.

Optionally, the difference threshold between the first potential difference and the second potential difference described in the above embodiments may be greater than or equal to 0 V and smaller than or equal to 0.5 V. It is to be understood that, the smaller the difference threshold is, the smaller the difference between the first potential difference and the second potential difference is, and the better the effect of reducing the flicker of the display panel can be achieved.

Figure 4:
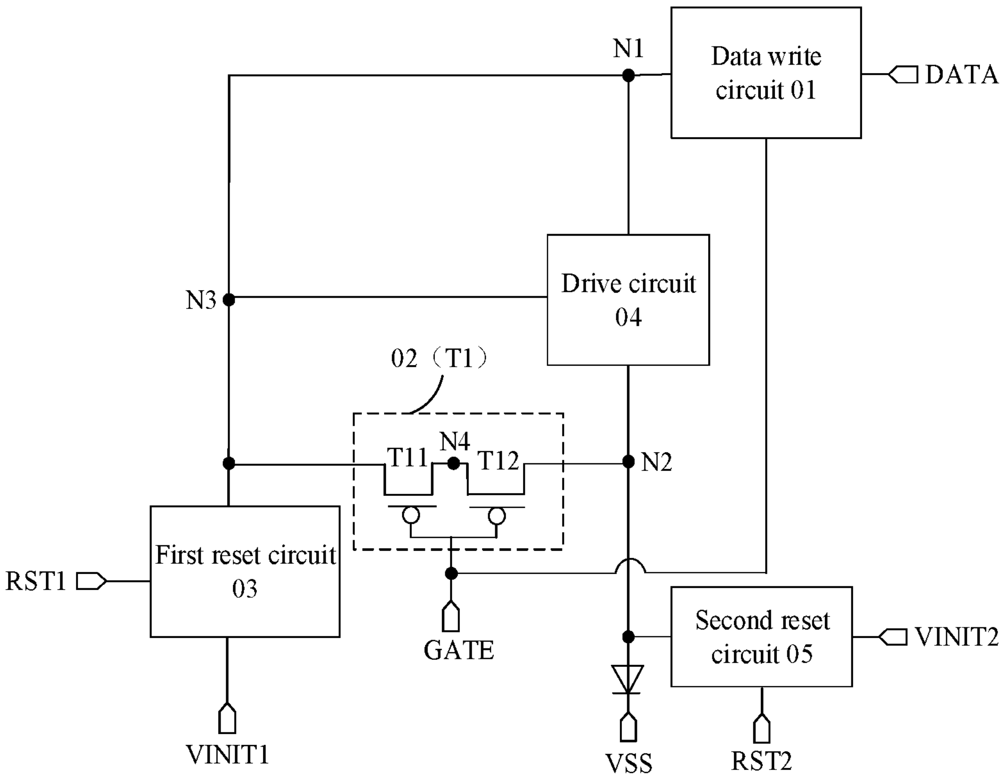
FIG. 4 is a schematic structural diagram of another pixel circuit according to an embodiment of the present disclosure.

FIG. 4 is a schematic structural diagram of another pixel circuit according to an embodiment of the present disclosure. As shown in FIG. 4, the compensation circuit 02 in the pixel circuit may include a compensation transistor T1.

A gate of the compensation transistor T1 may be coupled to the gate drive terminal GATE, a first electrode of the compensation transistor T1 may be coupled to the second node N2, and a second electrode of the compensation transistor T1 may be coupled to the third node N3. Furthermore, it can be seen from FIG. 4 that the compensation transistor T1 may be a double-gate transistor, that is, the compensation transistor T1 includes two transistors T11 and T12. Correspondingly, a series node N4 between the two transistors T11 and T12 is the first reference node described in the above embodiments.

Figure 5:
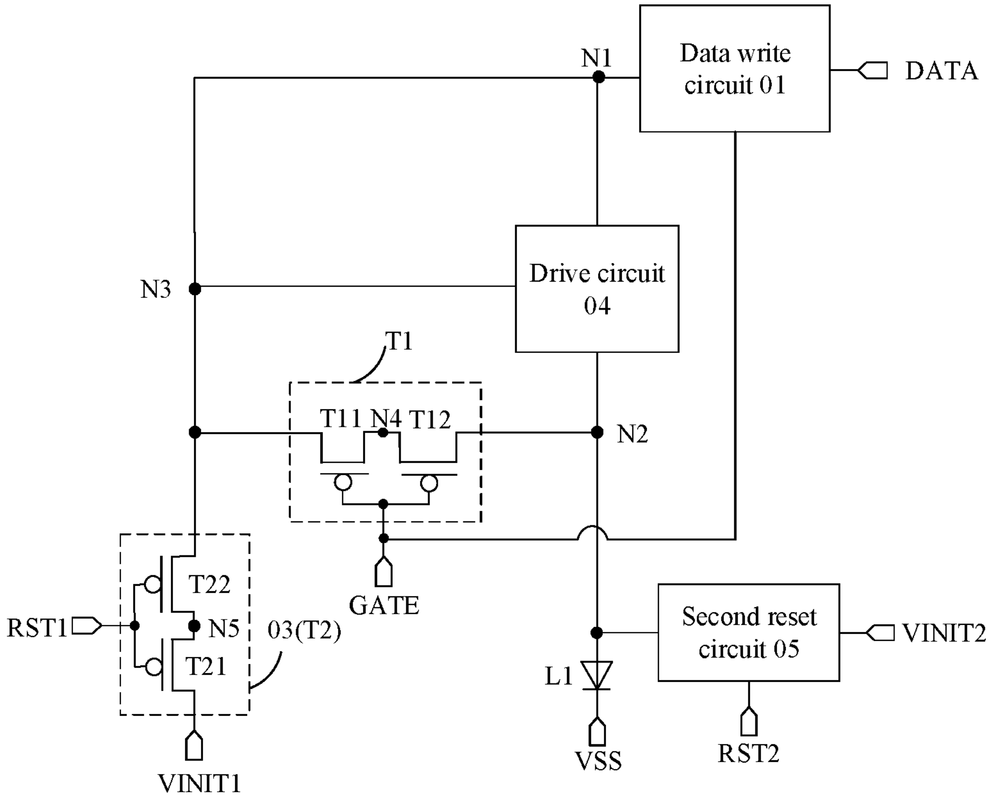
FIG. 5 is a schematic structural diagram of yet another pixel circuit according to an embodiment of the present disclosure.

FIG. 5 is a schematic structural diagram of yet another pixel circuit according to an embodiment of the present disclosure. As shown in FIG. 5, the first reset circuit 03 in the pixel circuit may include a first reset transistor T2.

A gate of the first reset transistor T2 may be coupled to the first reset signal terminal RST1, a first electrode of the first reset transistor T2 may be coupled to the first initial power supply terminal VINIT1, and a second electrode of the first reset transistor T2 may be coupled to the third node N3.

As an optional implementation, the first reset transistor T2 may be a double-gate transistor as shown in FIG. 5, that is, the first reset transistor T2 may include two transistors T21 and T22. On the basis of this structure, referring to FIG. 5, the second reference node described in the above embodiments may be a series node N5 between the two transistors T21 and T22 included in the first reset transistor T2.

Figure 6:
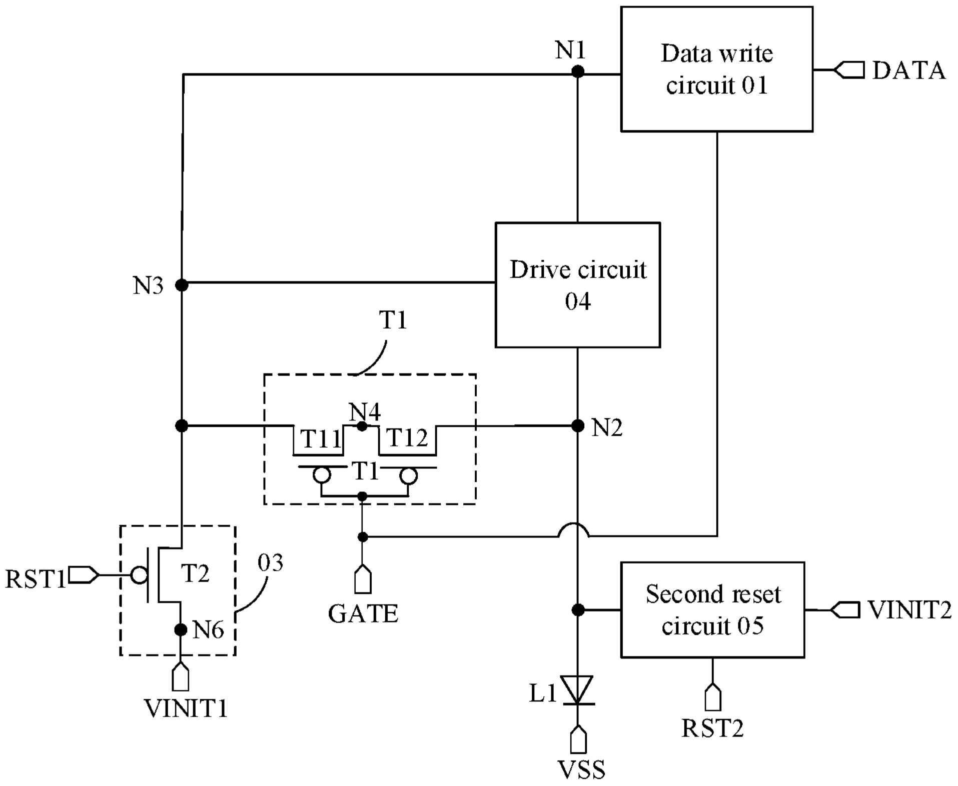
FIG. 6 is a schematic structural diagram of still yet another pixel circuit according to an embodiment of the present disclosure.

As another optional implementation, the first reset transistor T2 may be a single-gate transistor as shown in FIG. 6, that is, the first reset transistor T2 includes only one transistor. On the basis of this structure, referring to FIG. 6, the second reference node described in the above embodiments may be a coupling node N6 between the first electrode of the first reset transistor T2 and the first initial power supply terminal VINIT1.

Figure 7:
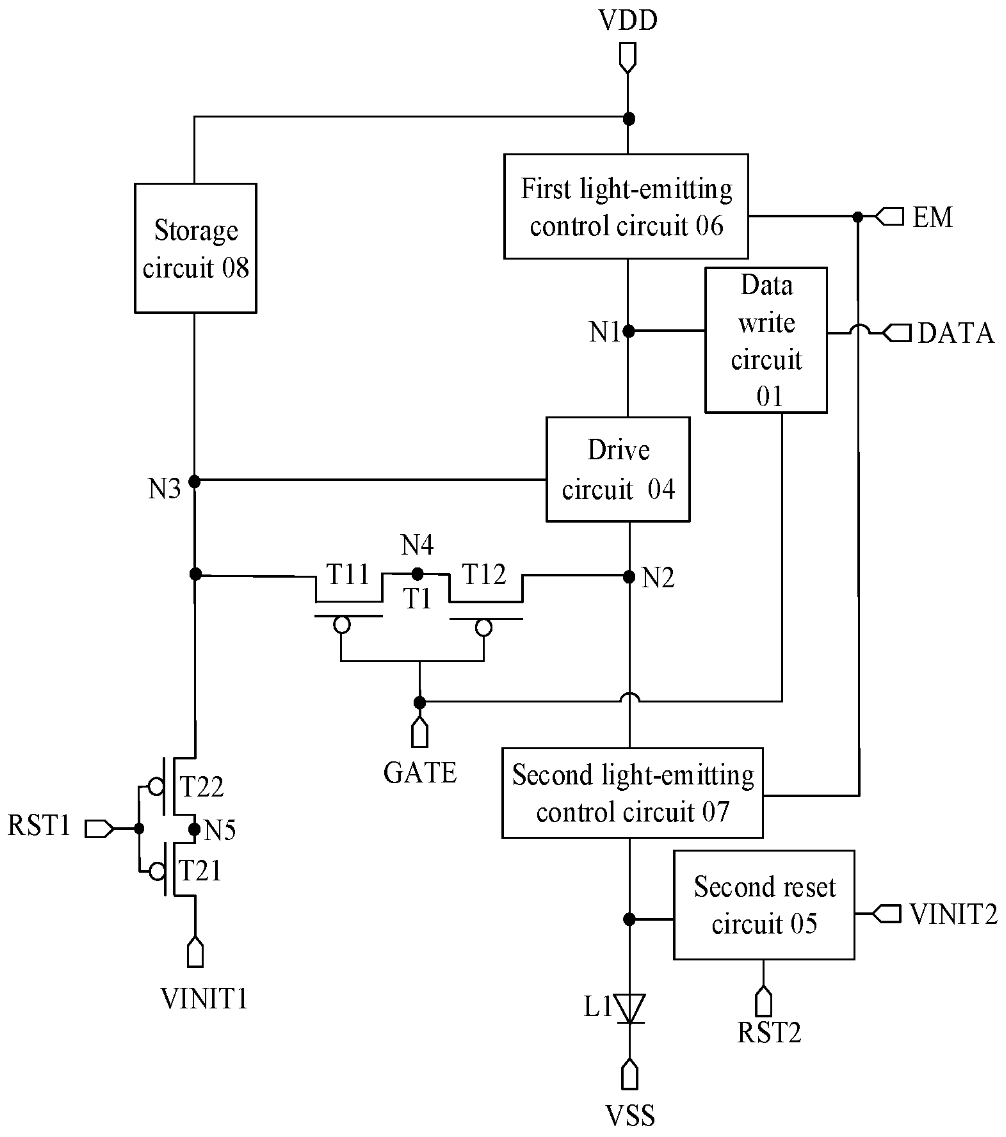
FIG. 7 is a schematic structural diagram of still yet another pixel circuit according to an embodiment of the present disclosure.

FIG. 7 is a schematic structural diagram of still yet another pixel circuit according to an embodiment of the present disclosure. As shown in FIG. 7, the pixel circuit may further include a first light-emitting control circuit 06, a second light-emitting control circuit 07 and a storage circuit 08.

The first light-emitting control circuit 06 may be coupled to a light-emitting control terminal EM, a drive power supply terminal VDD and a first node N1, and configured to transmit a drive power supply signal provided by the drive power supply terminal VDD to the first node N1 in response to a light-emitting control signal provided by the light-emitting control terminal EM.

For example, the first light-emitting control circuit 06 may transmit the drive power supply signal provided by the drive power supply terminal VDD to the first node N1 when a potential of the light-emitting control signal provided by the light-emitting control terminal EM is the first potential.

The second light-emitting control circuit 07 may be coupled to the light-emitting control terminal EM, the second node N2 and the first electrode of the light-emitting element L1, and configured to control conduction/non-conduction between the second node N2 and the first electrode of the light-emitting element L1 in response to the light-emitting control signal.

For example, the second light-emitting control circuit 07 may control the second node N2 to be conducted with the first electrode of the light-emitting element L1 in response to the potential of the light-emitting control signal being the first potential, and may control the second node N2 to be non-conducted with the first electrode of the light-emitting element L1 in response to the potential of the light-emitting control signal being the second potential. When the second node N2 is conducted with the first electrode of the light-emitting element L1, the drive signal transmitted by the drive circuit 04 to the second node N2 may be transmitted to the first electrode of the light-emitting element L1 via the second light-emitting control circuit 07, so as to drive the light-emitting element L1 to emit light.

The storage circuit 08 may be coupled to the drive power supply terminal VDD and the third node N3, and configured to adjust the potential of the third node N3 based on the drive power supply signal.

Figure 8:
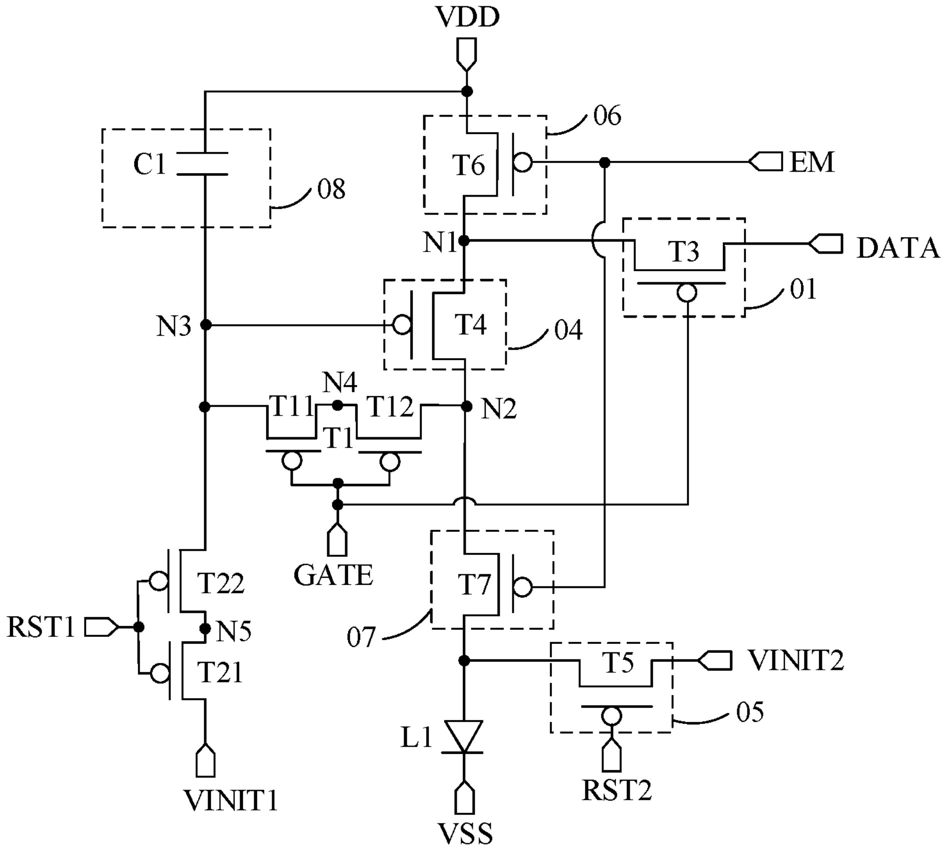
FIG. 8 is a schematic structural diagram of still yet another pixel circuit according to an embodiment of the present disclosure.

FIG. 8 is a schematic structural diagram of still yet another pixel circuit according to an embodiment of the present disclosure. As shown in FIG. 8, the data write circuit 01 may include a data write transistor T3; the drive circuit 04 may include a drive transistor T4; the second reset circuit 05 may include a second reset transistor T5; the first light-emitting control circuit 06 may include a first light-emitting control transistor T6; the second light-emitting control circuit 07 may include a second light-emitting control transistor T7; and the storage circuit 08 may include a storage capacitor C1.

A gate of the second reset transistor T5 may be coupled to the second reset signal terminal RST2, a first electrode of the second reset transistor T5 may be coupled to the second initial power supply terminal VINIT2, and a second electrode of the second reset transistor T5 may be coupled to the first electrode of the light-emitting element L1.

Optionally, the first reset signal terminal RST1 and the second reset signal terminal RST2 may be the same reset signal terminal.

A gate of the data write transistor T3 may be coupled to the gate drive terminal GATE, a first electrode gate of the data write transistor T3 coupled to the data signal terminal DATA, and a second electrode gate of the data write transistor T3 coupled to the first node N1.

A gate of the drive transistor T4 may be coupled to the third node N3, a first electrode gate of the drive transistor T4 may be coupled to the first node N1, and a second electrode gate of the drive transistor T4 may be coupled to the second node N2.

A gate of the first light-emitting control transistor T6 may be coupled to the light-emitting control terminal EM, a first electrode of the first light-emitting control transistor T6 may be coupled to the drive power supply terminal VDD, and a second electrode of the first light-emitting control transistor T6 may be coupled to the first node N1.

A gate of the second light-emitting control transistor T7 may be coupled to the light-emitting control terminal EM, a first electrode of the second light-emitting control transistor T7 may be coupled to the second node N2, and a second electrode of the second light-emitting control transistor T7 may be coupled to the first electrode of the light-emitting element L.

One end of the storage capacitor C1 may be coupled to the third node N3, and the other end of the storage capacitor C1 may be coupled to the drive power supply terminal VDD.

It should be noted that referring to FIG. 8, the above embodiments are described by taking an example in which the transistors are P-type transistors, and the first potential is a low potential relative to the second potential. Certainly, the transistors may also be N-type transistors, and the first potential is a high potential relative to the second potential when the transistors are N-type transistors.

First, the working principle of the pixel circuit is described below by taking the structure shown in FIG. 8, the transistors in the pixel circuit are P-type transistors and the first potential is a low potential relative to the second potential as an example.

Figure 9:
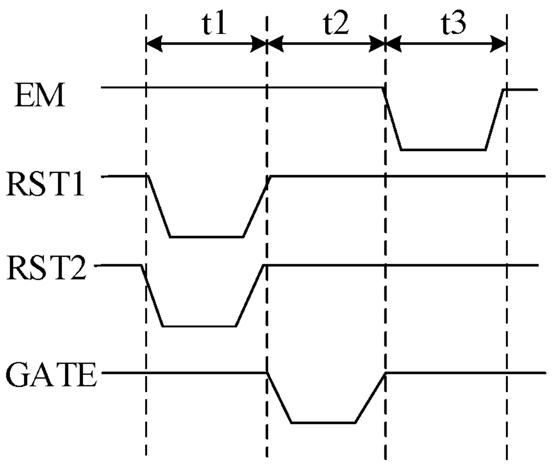
FIG. 9 is a timing sequence diagram of signal terminals in a pixel circuit according to an embodiment of the present disclosure.

FIG. 9 is a timing sequence diagram of signal terminals in a pixel circuit according to an embodiment of the present disclosure. As shown in FIG. 9, the process of driving, by the pixel circuit, the coupled light-emitting element L1 to emit light may include a resetting stage t1, a data writing stage t2 and a light-emitting stage t3.

In the resetting stage t1, both of the potential of the first reset signal provided by the first reset signal terminal RST1 and the potential of the second reset signal provided by the first reset signal terminal RST2 are the first potential. The first reset transistor T2 and the second reset transistor T5 are turned on. The first initial power supply signal provided by the first initial power supply terminal VINIT1 may be transmitted to the third node N3 via the turned-on first reset transistor T2, so as to reset the third node N3. The second initial power supply signal may be transmitted to the first electrode of the light-emitting element L1 via the turned-on second reset transistor T5, so as to reset the first electrode of the light-emitting element L1.

In the data writing stage t2, the potential of the gate drive signal provided by the gate drive terminal GATE is the first potential, and both of the data write transistor T3 and the compensation transistor T1 are turned on. The data signal provided by the data signal terminal DATA may be transmitted to the first node N1 via the turned-on data write transistor T3. In addition, in the resetting stage t1, the first initial power supply signal of the second potential is written to the third node N3, and under the adjustment action of the storage capacitor C1, the potential of the third node N3 may still maintain at the first initial power supply signal of the second potential in the current stage. The drive transistor T4 is turned on. Correspondingly, the data signal transmitted to the first node N1 may be transmitted to the second node N2 via the drive transistor T4. Thus, the compensation transistor T1 may reliably adjust the potential of the third node N3 based on the potential of the second node N2 and the gate drive signal.

In the light-emitting stage t3, the potential of the light-emitting control signal provided by the light-emitting control terminal EM is the first potential, and both of the first light-emitting control transistor T6 and the second light-emitting control transistor T7 are turned on. In addition, the drive transistor T4 maintains being turned-on under the adjustment action of the storage capacitor C1. In this way, the drive power supply signal provided by the drive power supply terminal VDD may be transmitted to the first electrode of the light-emitting element L1 via the first light-emitting control transistor T6, the drive transistor T4 and the second light-emitting control transistor T7, so as to drive the light-emitting element L1 to emit light.

Then, in conjunction with the descriptions of the working principle of the pixel circuit, the influence of the first reference node N4 on the third node N3 and the influence of the second reference node N5 on the third node N3 is described below still by taking the pixel circuit shown in FIG. 8 as an example.

Figure 10:
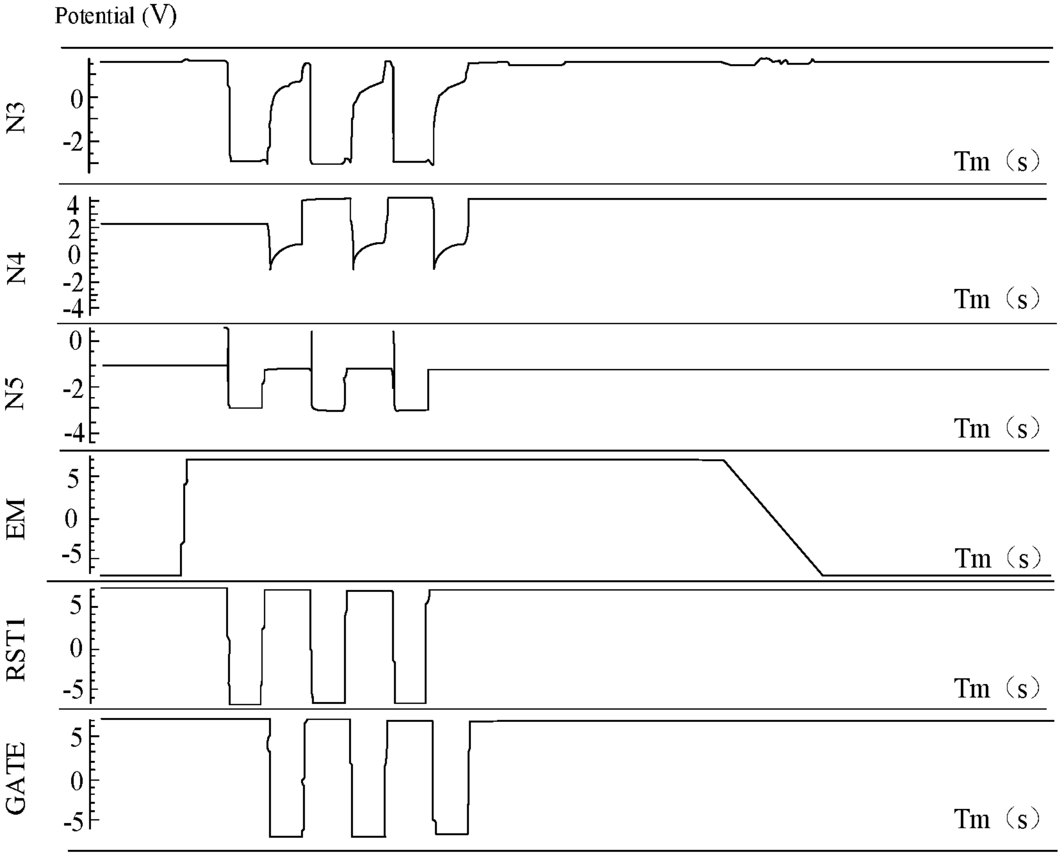
FIG. 10 is a timing simulation diagram of an electrical signal at nodes, a first reset signal terminal and a gate drive terminal according to an embodiment of the present disclosure.

For example, FIG. 10 is a timing simulation diagram of the first reference node N4, the second reference node N5, the third node N3, the first reset signal terminal RST1 and the gate drive terminal GATE. In FIG. 10, the horizontal axis represents time Tm in units of s, and the vertical axis represents potential in units of V.

It can be seen with reference to FIG. 9 and FIG. 10 that the potential of the first reset signal provided by the first reset signal terminal RST1 jumps from the first potential (a low potential as shown in the figure) to the second potential (a high potential as shown in the figure) at the end of the resetting stage t1. At the moment of jumping, i.e., at the moment when the first reset transistor T2 is turned off, the potential of the second reference node N5 is pulled up due to the influence of the potential jump of the first reset signal. Besides, in the light-emitting stage t3, the potential of the second reference node N5 is generally lower than the potential of the third node N3. Correspondingly, under the influence of electric leakage of the first reset transistor T2, the pulled-up potential of the second reference node N5 may pull down the potential of the third node N3 in the light-emitting stage t3.

For example, referring to FIGS. 9 and 10, the potential of the second reference node N5 is generally −3 V in the resetting stage t1 in the case that the potential of the first initial power supply signal is −3 V. At the moment when the potential of the first reset signal jumps, the potential of the second reference node N5 is generally pulled up from −3 V to about −1 V.

Similarly, it can be seen with reference to FIGS. 9 and 10 that the potential of the gate drive signal provided by the gate drive terminal GATE jumps from the first potential (a low potential as shown in the figure) to the second potential (a high potential as shown in the figure) at the end of the data writing stage t2. At the moment of jumping, i.e., at the moment when the compensation transistor T1 in the compensation circuit 02 is turned off, the potential of the first reference node N4 is pulled up due to the influence of the potential jump of the gate drive signal. Besides, since the storage capacitor C1 is also coupled to the third node N3 to stabilize the potential of the third node N3, and no capacitor is provided at the first reference node N4 for potential stabilization, the potential of the first reference node N4 is always higher than the potential of the third node N3 after the potential of the gate drive signal jumps. For example, the potential of the first reference node N4 is generally about 2 V higher than the potential of the third node N3. Correspondingly, under the influence of electric leakage of the compensation transistor T1, the potential of the first reference node N4 may pull up the potential of the third node N3 in the light-emitting stage t3.

Based on the above analysis, it can be determined that in the light-emitting stage t3, the potential of the first reference node N4 generally pulls up the potential of the third node N3, and the potential of the second reference node N5 generally pulls down the potential of the third node N3, that is, the influence of the potential of the first reference node N4 on the potential of the third node N3 is exactly opposite to the influence of the potential of the second reference node N5 on the potential of the third node N3. If the degrees of influence are different, the potential of the third node N3 may be unstable, resulting in the high-grayscale flicker of the display panel.

Figure 11:
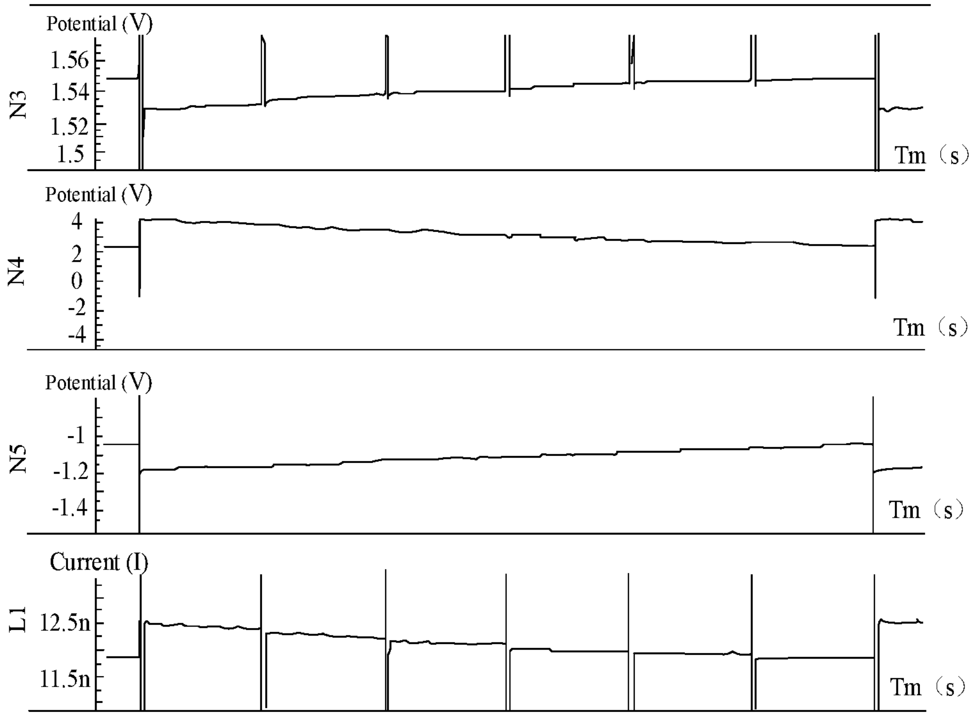
FIG. 11 is a timing simulation diagram of an electrical signal at nodes and a light-emitting element when a display panel displays one frame of picture according to an embodiment of the present disclosure.

For example, FIG. 11 is a timing simulation diagram of the potential of the first reference node N4, the potential of the second reference node N5, the potential of the third node N3 and the current of the light-emitting element L1 when the display panel displays one frame of picture. In FIG. 11, the horizontal axis represents time Tm in units of s, the vertical axis represents potential and current, with the potential in units of V and the current in units of Ampere (A).

It can be seen with reference to FIGS. 9 and 10 that in the case that the degree to which the potential of the second reference node N5 pulls down the potential of the third node N3 is smaller than the degree to which the potential of the first reference node N4 pulls up the potential of the third node N3, that is, the first potential difference is greater than the second potential difference, the potential of the third node N3 increases gradually. Correspondingly, the current flowing through the light-emitting element L1 reduces gradually, resulting in a low luminance retention rate of the display panel. Thus, the flicker as described in the above embodiments occurs on the display panel.

Moreover, by testing, the degree of influence of the potential of the first reference node N4 on the potential of the third node N3 is generally greater than the degree of influence of the potential of the second reference node N5 on the potential of the third node N3. That is, the degree to which the potential of the first reference node N4 pulls up the potential of the third node N3 is greater than the degree to which the potential of the second reference node N5 pulls down the potential of the third node N3. In this case, the potential of the first initial power supply signal may be decreased such that the degree to which the potential of the second reference node N5 pulls down the potential of the third node N3 may be increased, that is, the degree of influence of the potential of the first reference node N4 on the potential of the third node N3 and the degree of influence of the potential of the second reference node N5 on the potential of the third node N3 are as same as possible. On the basis of the same degree of influence, the difference between the first potential difference and the second potential difference may be smaller than or equal to the difference threshold, and the potential of the third node N3 may more stable.

Optionally, the data signal described in the above embodiments is generally an AC signal, and correspondingly, the data signal has a maximum potential VGH and a minimum potential VGL. In addition, the potential of the first initial power supply signal may be smaller than the minimum potential VGL of the data signal.

For example, the potential of the first initial power supply signal may be smaller than or equal to the difference between the minimum potential VGL of the data signal and the first reference potential. The difference between the minimum potential VGL of the data signal and the first reference potential may refer to the difference acquired by subtracting the first reference potential from the minimum potential VGL of the data signal.

The first reference potential may be 2 V. In this way, the potential Vinit1 of the first initial power supply signal may be smaller than or equal to VGL-2 V. In other words, in the embodiment of the present disclosure, high-grayscale flicker of the display panel can be reduced by pulling down the potential of the first initial power supply signal.

In conjunction with FIG. 8, it should be noted that, in the case that the second reference node N5 is the series node between the double-gate transistors T21 and T22 included in the first reset transistor T2, the potential of the second reference node N5 may theoretically reach VGL+swtft_Vth in the resetting stage, in which swtftVth refers to a threshold voltage of any of the double-gate transistors T21 and T22. For example, swtft_Vth may refer to the threshold voltage of the transistor T21 directly coupled to the first initial power supply terminal VINIT1. Based on this, it can be determined that the first initial power supply signals of different potentials may reduce flicker of the display panel to the same extent on the premise that the potential of the first initial power supply signal is greater than Vgl+swtf_Vth. Therefore, for the structure shown in FIG. 8, the only requirement is to decrease the potential of the first initial power supply signal to VGL+swtft_Vth.

Certainly, in some embodiments, the influence of the potential of the first reference node N4 on the potential of the third node N3 may be smaller than the influence of the potential of the second reference node N5 on the potential of the third node. That is, the degree to which the potential of the first reference node N4 pulls up the potential of the third node N3 may be smaller than the degree to which the potential of the second reference node N5 pulls down the potential of the third node N3. In this case, the potential of the first initial power supply signal may be increased such that the degree to which the potential of the second reference node N5 pulls down the potential of the third node N3 may be reduced, that is, the degree of influence of the potential of the first reference node N4 on the potential of the third node N3 and the degree of influence of the potential of the second reference node N5 on the potential of the third node N3 are as same as possible. As described in the above embodiments, on the basis of the same degree of influence, the difference between the first potential difference and the second potential difference may be smaller than or equal to the difference threshold, and the potential of the third node N3 may be more stable.

In addition, in the case that the potential of the first initial power supply signal is greater than the turn-on potential of the drive transistor T4, the drive transistor T4 may be turned on mistakenly in the resetting stage t1, which affects the display effect. Therefore, in the embodiment of the present disclosure, the pulled-up potential of the first initial power supply signal may be greater than the minimum potential of the data signal, and may be smaller than the turn-on potential of the transistor (i.e., the drive transistor T4) included in the drive circuit. In this way, the high-grayscale flicker of the display panel can be effectively reduced by pulling up the potential of the first initial power supply signal under the premise of ensuring the normal write of the data signal.

Figure 12:
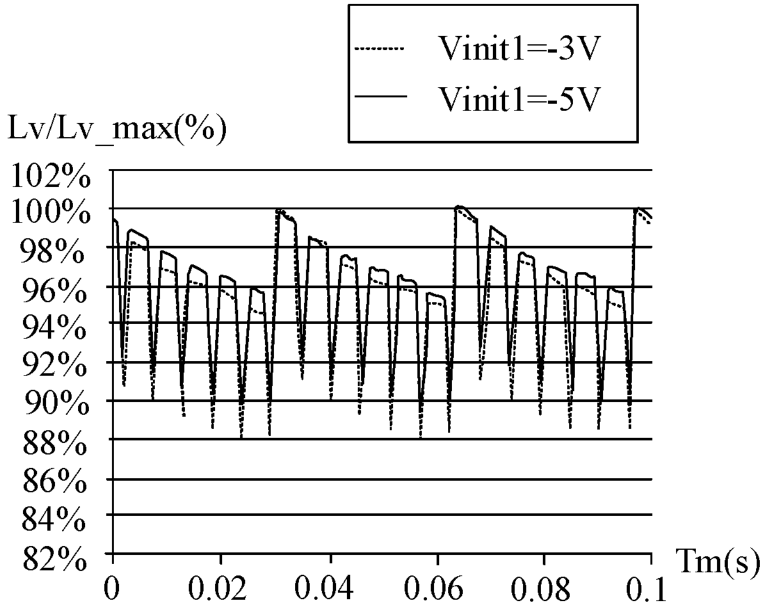
FIG. 12 is a schematic diagram showing a change of a luminance retention rate of a display panel with time under different potentials of a first initial power supply signal according to an embodiment of the present disclosure.
Figure 13:
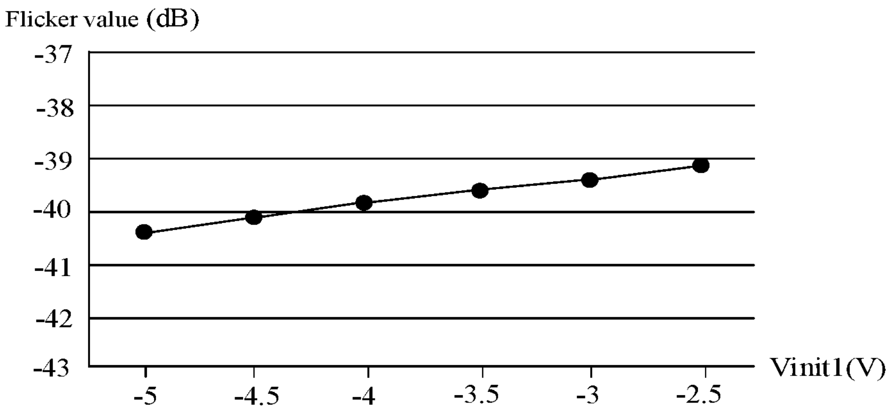
FIG. 13 is a schematic diagram showing a change of a flicker value of a display panel with a potential of a first initial power supply signal according to an embodiment of the present disclosure.

By taking that the luminous intensity per unit area of the display panel is 450 nits, and the display panel displays a 255-grayscale picture as a test condition, and taking an example in which the potential of the first initial power supply signal is decreased such that the difference between the first potential difference and the second potential difference is smaller than or equal to the difference threshold, FIG. 12 is a schematic diagram showing the change of the luminance retention rate of the display panel with time when the potential Vinit1 of the first initial power supply signal is −3 V and −5 V under this test condition, and FIG. 13 is a schematic diagram showing the change of the flicker value of the display panel with the potential Vinit1 of the first initial power supply signal under this test condition.

In FIG. 12, the horizontal axis represents time Tm in units of s, and the vertical axis represents the luminance retention rate of the display panel. The luminance retention rate of the display panel refers to the ratio of the real-time luminance Lv of the display panel to the maximum luminance Lv_max of the display panel in the current frame. In addition, it can be seen from FIG. 12 that the smaller the potential of the first initial power supply signal is, the higher the luminance retention rate is when the display panel displays one frame of picture.

In FIG. 13, the horizontal axis represents the potential Vinit1 of the first initial power supply signal in units of V, and the vertical axis represents the flicker value. The flicker value may be a decibel value (in units of dB) of the flicker frequency calculated according to the JEITA algorithm. Moreover, it should be noted that the greater the flicker value is, the more severely the display panel flickers. The JEITA algorithm is short for a method for testing the flicker value, stipulated by Japan Electronics and Information Technology Association. It can be further seen from FIG. 13 that the smaller the potential Vinit1 of the first initial power supply signal is, the less likely the display panel is to flicker.

Optionally, the minimum potential VGL of the data signal may be the same as the potential of the pull-down power supply signal provided by the pull-down power supply terminal VSS. In addition, the potential of the first initial power supply signal may be smaller than the minimum potential of the data signal, and the potential of the second initial power supply signal may be greater than the minimum potential of the data signal. That is, the minimum potential of the data signal may be between the potential of the first initial power supply signal and the potential of the second initial power supply signal.

In other words, in the embodiment of the present disclosure, the potential of the first initial power supply signal may be pulled down with reference to the minimum potential of the data signal (i.e., the potential of the pull-down power supply signal), to reduce high-grayscale flicker of the display panel. In addition, the potential of the second initial power supply signal may be pulled up with reference to the minimum potential of the data signal (i.e., the potential of the pull-down power supply signal), to reduce low-grayscale flicker of the display panel.

For example, assuming that the minimum potential VGL of the data signal (i.e., the potential of the pull-down power supply signal) is −5 V, in the embodiment of the present disclosure, the potential of the first initial power supply signal may be pulled down with reference to the potential of −5 V, that is, the potential of the first initial power supply signal may be set to be smaller than −5 V, to reduce the high-grayscale flicker of the display panel. In addition, the potential of the second initial power supply signal may be pulled up with reference to the potential of −5 V, that is, the potential of the second initial power supply signal is set to be greater than −5 V, to reduce the low-grayscale flicker of the display panel.

As described in the above embodiments, in some embodiments, the high-grayscale flicker of the display panel may also be reduced by pulling up the potential of the first initial power supply signal.

It should be noted that in the above descriptions, the potential of the first initial power supply signal and the potential of the second initial power supply signal are adjusted to reduce the flicker of the display panel, on the premise that all the transistors are P-type transistors. For N-type transistors, the principle of improvement is the same as above, and thus details are not repeated herein.

In summary, the embodiment of the present disclosure provides the pixel circuit. In the pixel circuit, the data write circuit may transmit the data signal to the first node; the compensation circuit may adjust the potential of the second node and the potential of the third node based on the gate drive signal; the first reset circuit may transmit the first initial power supply signal to the third node; the drive circuit may transmit the drive signal to the second node based on the potential of the third node and the potential of the first node; and the second reset circuit may transmit the second initial power supply signal to the light-emitting element. In addition, the compensation circuit includes the double-gate transistor. Since the difference between the potential of the second initial power supply signal and the potential of the pull-down power supply signal is smaller than the turn-on voltage of the light-emitting element, and the potential of the second initial power supply signal is greater than the potential of the pull-down power supply signal, not only the light-emitting element can be effectively prevented from being turned on mistakenly prior to the light-emitting stage, but also it is easier to turn on the light-emitting element in the light-emitting stage, thereby effectively preventing the display panel from flicker.

Figure 14:
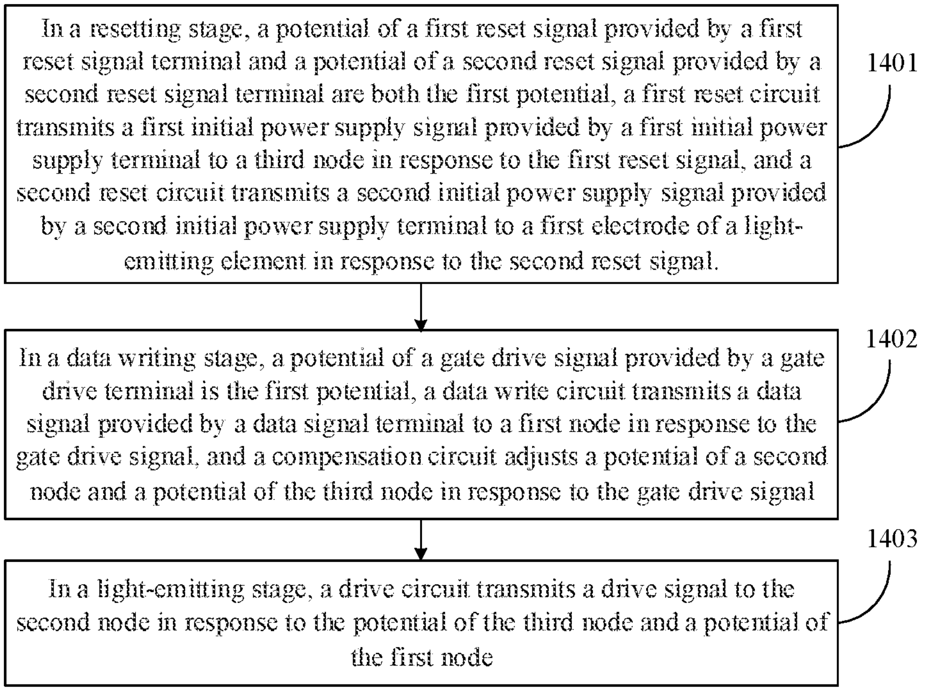
FIG. 14 is a flowchart of a method for driving a pixel circuit according to an embodiment of the present disclosure.

FIG. 14 is a flowchart of a method for driving a pixel circuit according to an embodiment of the present disclosure. The method may be applicable to drive the pixel circuit as shown in any one of FIGS. 1 to 6. As shown in FIG. 14, the method may include the following steps.

In step 1401, in a resetting stage, a potential of a first reset signal provided by a first reset signal terminal and a potential of a second reset signal provided by a second reset signal terminal are both the first potential, a first reset circuit transmits a first initial power supply signal provided by a first initial power supply terminal to a third node in response to the first reset signal, and a second reset circuit transmits a second initial power supply signal provided by a second initial power supply terminal to a first electrode of a light-emitting element in response to the second reset signal.

A potential of the first initial power supply signal and a potential of the second initial power supply signal may both be the second potential.

In step 1402, in a data writing stage, a potential of a gate drive signal provided by a gate drive terminal is the first potential, a data write circuit transmits a data signal provided by a data signal terminal to a first node in response to the gate drive signal, and a compensation circuit adjusts a potential of a second node and a potential of the third node in response to the gate drive signal.

In step 1403, in a light-emitting stage, a drive circuit transmits a drive signal to the second node in response to the potential of the third node and a potential of the first node.

The difference between the potential of the second initial power supply signal and a potential of a pull-down power supply signal provided by a pull-down power supply terminal coupled to a second electrode of the light-emitting element is smaller than a turn-on voltage of the light-emitting element, and the potential of the second initial power supply signal is greater than the potential of the pull-down power supply signal.

In summary, the embodiment of the present disclosure provides the method for driving a pixel circuit. In the pixel circuit, the data write circuit may transmit the data signal to the first node; the compensation circuit may adjust the potential of the second node and the potential of the third node based on the gate drive signal; the first reset circuit may transmit the first initial power supply signal to the third node; the drive circuit may transmit the drive signal to the second node based on the potential of the third node and the potential of the first node; and the second reset circuit may transmit the second initial power supply signal to the light-emitting element. In addition, the compensation circuit includes the double-gate transistor. Since the difference between the potential of the second initial power supply signal and the potential of the pull-down power supply signal is smaller than the turn-on voltage of the light-emitting element, and the potential of the second initial power supply signal is greater than the potential of the pull-down power supply signal, not only the light-emitting element can be effectively prevented from being turned on mistakenly prior to the light-emitting stage, but also it is easier to turn on the light-emitting element in the light-emitting stage, thereby effectively preventing the display panel from flicker.

Figure 15:
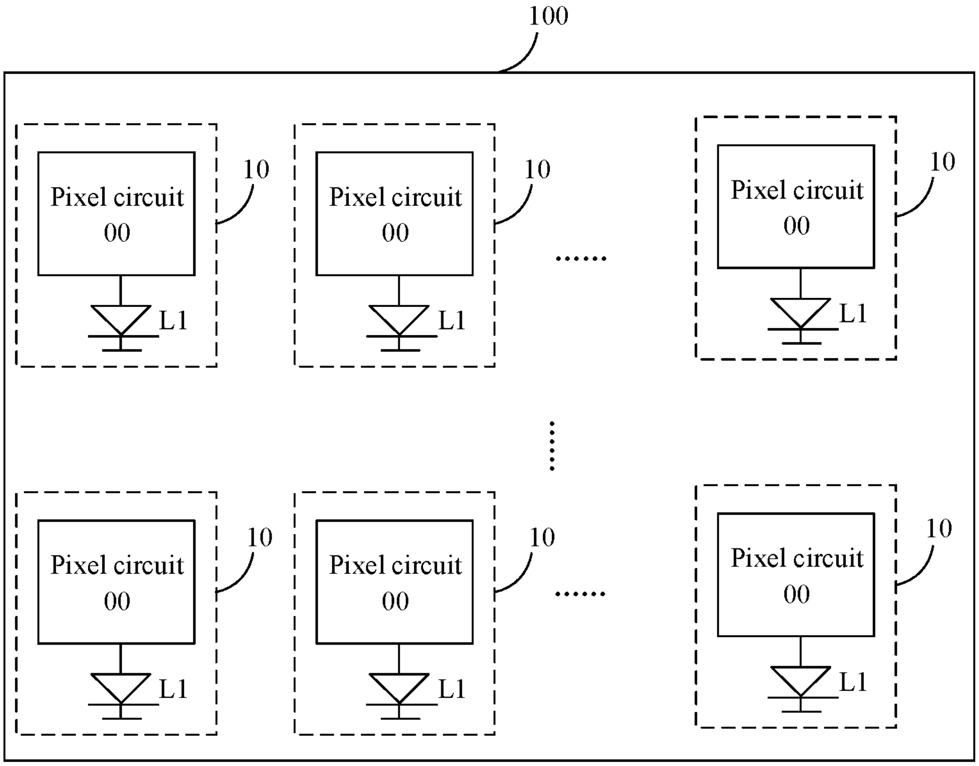
FIG. 15 is a schematic structural diagram of a display panel according to an embodiment of the present disclosure.

FIG. 15 is a schematic structural diagram of a display panel according to an embodiment of the present disclosure. As shown in FIG. 15, the display panel 100 may include a plurality of pixels 10, and at least one of the pixels 10 may include a light-emitting element L1, and the pixel circuit 00 shown in any one of FIGS. 1, 4, 5, 6, 7 and 8 and coupled to the light-emitting element L1. The pixel circuit 00 may be configured to drive the light-emitting element L1 to emit light.

Figure 16:
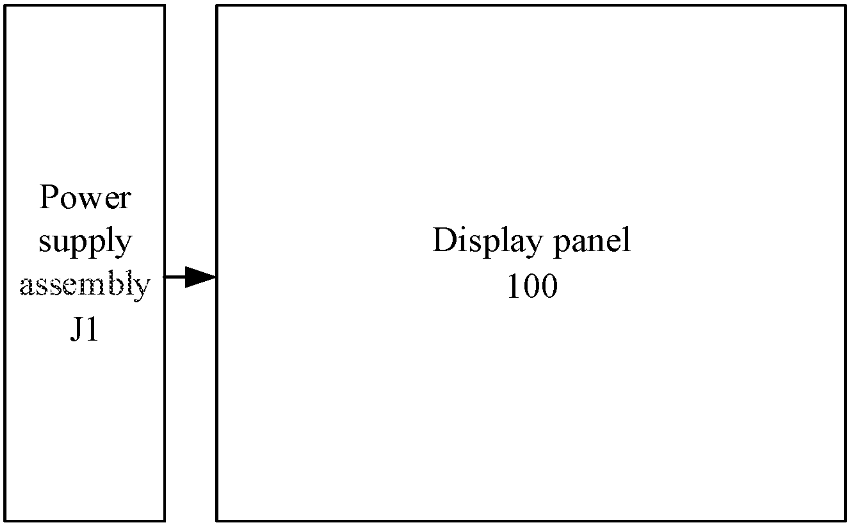
FIG. 16 is a schematic structural diagram of a display device according to an embodiment of the present disclosure.

FIG. 16 is a schematic structural diagram of a display device according to an embodiment of the present disclosure. As shown in FIG. 16, the display device may include a power supply assembly J1 and the display panel 100 as shown in FIG. 15.

The power supply assembly J1 may be coupled to the display panel 100, and configured to supply power to the display panel 100.

Optionally, the display device may be any product or component having a display function, such as an AMOLED display device, a liquid crystal display device, electronic paper, a mobile phone, a tablet computer, a TV, a display, a notebook computer, a digital photo frame or the like.

The term "and/or" used in the present disclosure indicates the existence of three kinds of relationship. For example, A and/or B, can be expressed as: A exists alone, A and B exist concurrently, and B exists alone. In addition, the character "/" generally indicates that the context object is an "OR" relationship.

The foregoing descriptions are merely optional embodiments of the present disclosure, and are not intended to limit the present disclosure. Within the spirit and principles of the present disclosure, any modifications, equivalent substitutions, improvements, and the like shall fall within the protection scope of the present disclosure.

What is claimed is:

1. A pixel circuit, comprising:

a data write circuit, coupled to a gate drive terminal, a data signal terminal and a first node and configured to transmit a data signal provided by the data signal terminal to the first node in response to a gate drive signal provided by the gate drive terminal;

a compensation circuit, coupled to the gate drive terminal, a second node and a third node and configured to adjust a potential of the second node and a potential of the third node in response to the gate drive signal;

a first reset circuit, coupled to a first reset signal terminal, a first initial power supply terminal and the third node and configured to transmit a first initial power supply signal provided by the first initial power supply terminal to the third node in response to a first reset signal provided by the first reset signal terminal;

a drive circuit, coupled to the first node, the second node and the third node and configured to transmit a drive signal to the second node in response to the potential of the third node and a potential of the first node; and a second reset circuit, coupled to a second reset signal terminal, a second initial power supply terminal and a first electrode of a light-emitting element, a second electrode of the light-emitting element being coupled to a pull-down power supply terminal, wherein the second reset circuit is configured to transmit a second initial power supply signal provided by the second initial power supply terminal to the first electrode of the light-emitting element in response to a second reset signal provided by the second reset signal terminal;

wherein a difference acquired by subtracting a potential of a pull-down power supply signal provided by the pull-down power supply terminal from a potential of the second initial power supply signal is smaller than a turn-on voltage of the light-emitting element, and the potential of the second initial power supply signal is greater than the potential of the pull-down power supply signal.

2. The pixel circuit according to claim 1, wherein a difference between a first potential difference and a second potential difference of the pixel circuit in a light-emitting stage is smaller than or equal to a difference threshold;

wherein the first potential difference is a potential difference between the third node and a first reference node, the second potential difference is a potential difference between the third node and a second reference node, the first reference node being a series node between two transistors in a double-gate transistor in the compensation circuit, and the second reference node being one of a series node between two transistors in a double-gate transistor in the first reset circuit and a coupling node between a single-gate transistor in the first reset circuit and the first initial power supply terminal.

3. The pixel circuit according to claim 2, wherein the first reset circuit comprises a first reset transistor; wherein a gate of the first reset transistor is coupled to the first reset signal terminal, a first electrode of the first reset transistor is coupled to the first initial power supply terminal, and a second electrode of the first reset transistor is coupled to the third node;

the first reset transistor is a double-gate transistor, and the second reference node is a series node between two transistors in the first reset transistor; or the first reset transistor is a single-gate transistor, and the second reference node is a coupling node between the first electrode of the first reset transistor and the first initial power supply terminal.

4. The pixel circuit according to claim 2, wherein the difference threshold is greater than or equal to 0 V and smaller than or equal to 0.5 V.

5. The pixel circuit according to claim 1, wherein a potential of the first initial power supply signal is greater than a minimum potential of the data signal and smaller than a turn-on potential of a transistor in the drive circuit.

6. The pixel circuit according to claim 1, wherein a potential of the first initial power supply signal is smaller than a minimum potential of the data signal.

7. The pixel circuit according to claim 6, wherein the second reference node is a series node of a double-gate transistor in the first reset circuit; and the potential of the first initial power supply signal is greater than a sum of the minimum potential of the data signal and a threshold voltage of any transistor in the double-gate transistor in the first reset circuit.

8. The pixel circuit according to claim 1, wherein a potential of the first initial power supply signal is smaller than or equal to a difference between a minimum potential of the data signal and a first reference potential;

wherein the first reference potential is 2 V.

9. The pixel circuit according to claim 1, wherein the potential of the second initial power supply signal is smaller than or equal to a sum of the potential of the pull-down power supply signal and a second reference potential;

wherein the second reference potential is 0.5 V.

10. The pixel circuit according to claim 1, wherein a minimum potential of the data signal is the same as the potential of the pull-down power supply signal.

11. The pixel circuit according to claim 10, wherein a potential of the first initial power supply signal is smaller than the minimum potential of the data signal, and the potential of the second initial power supply signal is greater than the minimum potential of the data signal.

12. The pixel circuit according to claim 1, wherein the second reset circuit comprises a second reset transistor; wherein a gate of the second reset transistor is coupled to the second reset signal terminal, a first electrode of the second reset transistor is coupled to the second initial power supply terminal, and a second electrode of the second reset transistor is coupled to the first electrode of the light-emitting element.

13. The pixel circuit according to claim 1, wherein the first reset signal terminal and the second reset signal terminal are the same reset signal terminal.

14. The pixel circuit according to claim 1, wherein the compensation circuit comprises a compensation transistor, and the compensation transistor is a double-gate transistor; wherein a gate of the compensation transistor is coupled to the gate drive terminal, a first electrode of the compensation transistor is coupled to the second node, and a second electrode of the compensation transistor is coupled to the third node.

15. The pixel circuit according to claim 1, wherein the data write circuit comprises a data write transistor; and the drive circuit comprises a drive transistor; wherein a gate of the data write transistor is coupled to the gate drive terminal, a first electrode of the data write transistor is coupled to the data signal terminal, and a second electrode of the data write transistor is coupled to the first node; and a gate of the drive transistor is coupled to the third node, a first electrode of the drive transistor is coupled to the first node, and a second electrode of the drive transistor is coupled to the second node.

16. The pixel circuit according to claim 1, further comprising a first light-emitting control circuit, a second light-emitting control circuit and a storage circuit; wherein the first light-emitting control circuit is coupled to a light-emitting control terminal, a drive power supply terminal and the first node, and configured to transmit a drive power supply signal provided by the drive power supply terminal to the first node in response to a light-emitting control signal provided by the light-emitting control terminal;

the second light-emitting control circuit is coupled to the light-emitting control terminal, the second node and the first electrode of the light-emitting element, and configured to control conduction/non-conduction between the second node and the first electrode of the light-emitting element in response to the light-emitting control signal; and the storage circuit is coupled to the drive power supply terminal and the third node, and configured to adjust the potential of the third node based on the drive power supply signal.

17. The pixel circuit according to claim 16, wherein the first light-emitting control circuit comprises a first light-emitting control transistor; the second light-emitting control circuit comprises a second light-emitting control transistor; and the storage circuit comprises a storage capacitor; wherein a gate of the first light-emitting control transistor is coupled to the light-emitting control terminal, a first electrode of the first light-emitting control transistor is coupled to the drive power supply terminal, and a second electrode of the first light-emitting control transistor is coupled to the first node;

a gate of the second light-emitting control transistor is coupled to the light-emitting control terminal, a first electrode of the second light-emitting control transistor is coupled to the second node, and a second electrode of the second light-emitting control transistor is coupled to the first electrode of the light-emitting element; and one end of the storage capacitor is coupled to the third node, and the other end of the storage capacitor is coupled to the drive power supply terminal.

18. A method for driving a pixel circuit, comprising:

in a resetting stage, transmitting, by a first reset circuit, a first initial power supply signal provided by a first initial power supply terminal to a third node in response to a first reset signal provided by a first reset signal terminal, and transmitting, by a second reset circuit, a second initial power supply signal provided by a second initial power supply terminal to a first electrode of a light-emitting element in response to a second reset signal provided by a second reset signal terminal, wherein a potential of the first reset signal and a potential of the second reset signal are both a first potential;

in a data writing stage, transmitting, by a data write circuit, a data signal provided by a data signal terminal to a first node in response to a gate drive signal provided by a gate drive terminal, and adjusting, by a compensation circuit, a potential of a second node and a potential of the third node in response to the gate drive signal, wherein a potential of the gate drive signal is the first potential; and in a light-emitting stage, transmitting, by a drive circuit, a drive signal to the second node in response to the potential of the third node and a potential of the first node;

wherein a difference acquired by subtracting a potential of a pull-down power supply signal provided by a pull-down power supply terminal coupled to a second electrode of the light-emitting element from a potential of the second initial power supply signal is smaller than a turn-on voltage of the light-emitting element, and the potential of the second initial power supply signal is greater than the potential of the pull-down power supply signal.

19. A display panel, comprising a plurality of pixels, wherein at least one of the pixels comprises a light-emitting element and the pixel circuit as defined in claim 1, wherein the pixel circuit is coupled to the light-emitting element and configured to drive the light-emitting element to emit light.

* * * * *